United States Patent
Peng et al.

(10) Patent No.: US 11,496,660 B2
(45) Date of Patent: Nov. 8, 2022

(54) DUAL SENSOR IMAGING SYSTEM AND DEPTH MAP CALCULATION METHOD THEREOF

(71) Applicant: Altek Semiconductor Corp., Hsinchu (TW)

(72) Inventors: Shih-Yuan Peng, Hsinchu (TW); Shu-Chun Cheng, Hsinchu (TW); Hsu-Lien Huang, Taipei (TW); Yun-Chin Li, Hsinchu (TW); Kuo-Ming Lai, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 17/214,946

(22) Filed: Mar. 29, 2021

(65) Prior Publication Data

US 2021/0243344 A1   Aug. 5, 2021

Related U.S. Application Data

(60) Provisional application No. 63/074,477, filed on Sep. 4, 2020.

(30) Foreign Application Priority Data

Dec. 30, 2020  (TW) ................. 109146922

(51) Int. Cl.
   *H04N 5/225*  (2006.01)
   *G06T 7/50*   (2017.01)
   *G06T 7/44*   (2017.01)

(52) U.S. Cl.
   CPC ............. *H04N 5/2258* (2013.01); *G06T 7/44* (2017.01); *G06T 7/50* (2017.01); *G06T 2207/10028* (2013.01)

(58) Field of Classification Search
   CPC .. H04N 5/2258; H04N 5/2351; H04N 5/2353; H04N 5/33; H04N 5/357;
   (Continued)

(56) References Cited

U.S. PATENT DOCUMENTS

| 2008/0024608 A1 | 1/2008 | Hahn et al. |
| 2011/0228096 A1* | 9/2011 | Friel ............. H04N 5/332 348/E5.09 |

(Continued)

FOREIGN PATENT DOCUMENTS

| CN | 102461156 | 5/2012 |
| CN | 107431760 | 12/2017 |

(Continued)

OTHER PUBLICATIONS

"Office Action of Taiwan Counterpart Application, application No. 109146922", dated Oct. 28, 2021, p. 1-p. 14.
(Continued)

*Primary Examiner* — Padma Haliyur
(74) *Attorney, Agent, or Firm* — JCIPRNET

(57) ABSTRACT

A dual sensor imaging system and a depth map calculation method thereof are provided. The dual sensor imaging system includes at least one color sensor, at least one infrared ray (IR) sensor, a storage device, and a processor. The processor is configured to load and execute a computer program stored in the storage device to: control the color sensor and the IR sensor to respectively capture multiple color images and multiple IR images by adopting multiple exposure conditions suitable for an imaging scene, adaptively select a combination of the color image and the IR image that are comparable to each other from the color images and the IR images; and calculate a depth map of the imaging scene by using the selected color image and IR image.

18 Claims, 7 Drawing Sheets

(58) Field of Classification Search
CPC ......... H04N 9/04553; G06T 7/44; G06T 7/50; G06T 2207/10028; G06T 2207/10024; G06T 2207/10048; G06T 2207/10144; G06T 7/593; G01B 11/24
See application file for complete search history.

(56) References Cited

U.S. PATENT DOCUMENTS

| | | | |
|---|---|---|---|
| 2011/0298898 A1* | 12/2011 | Jung | H04N 13/239 348/47 |
| 2012/0189293 A1* | 7/2012 | Cao | H04N 5/2258 396/333 |
| 2013/0342703 A1 | 12/2013 | Lin | |
| 2015/0245062 A1* | 8/2015 | Shimizu | H04N 13/111 375/240.15 |
| 2015/0334283 A1 | 11/2015 | Vranceanu | |
| 2016/0212411 A1 | 7/2016 | Lindner et al. | |
| 2017/0094141 A1 | 3/2017 | Hicks | |
| 2017/0318222 A1 | 11/2017 | Mantzel et al. | |
| 2017/0330053 A1 | 11/2017 | Park et al. | |
| 2018/0137431 A1 | 5/2018 | Goldfarb et al. | |
| 2018/0139431 A1 | 5/2018 | Simek et al. | |
| 2018/0278832 A1* | 9/2018 | Shabtay | H04N 9/04557 |
| 2019/0197667 A1* | 6/2019 | Paluri | H04N 9/045 |
| 2020/0126246 A1 | 4/2020 | Mantzel et al. | |
| 2020/0134849 A1 | 4/2020 | Blasco Claret et al. | |
| 2020/0166646 A1 | 5/2020 | Van Der Sijde et al. | |
| 2020/0193584 A1 | 6/2020 | Park et al. | |
| 2020/0294214 A1* | 9/2020 | Numata | H04N 5/2351 |
| 2021/0201476 A1* | 7/2021 | Prasad | G06T 5/007 |

FOREIGN PATENT DOCUMENTS

| | | | | |
|---|---|---|---|---|
| CN | 107846537 | | 3/2018 | |
| CN | 110462686 | | 11/2019 | |
| CN | 110533709 | | 12/2019 | |
| CN | 110706178 | | 1/2020 | |
| CN | 111527743 | | 8/2020 | |
| CN | 111540003 | | 8/2020 | |
| TW | M458748 | | 8/2013 | |
| TW | 201630408 | | 8/2016 | |
| TW | 201721269 | | 6/2017 | |
| TW | 201931847 | | 8/2019 | |
| TW | 202008214 | | 2/2020 | |
| WO | WO-2020055619 A1 * | | 3/2020 | G01S 17/86 |

OTHER PUBLICATIONS

"Office Action of Taiwan Related Application, application No. 109145632", dated Nov. 10, 2021, p. 1-p. 8.
"Office Action of Taiwan Related Application, application No. 109146831", dated Nov. 30, 2021, p. 1-p. 21.
"Office Action of Taiwan Related Application, application No. 109146764", dated Dec. 28, 2021, p. 1-p. 8.
"Office Action of Taiwan Related Application, Application No. 109145614", dated Mar. 3, 2022, p. 1-p. 17.
"Office Action of Related U.S. Appl. No. 17/191,701", dated Apr. 28, 2022, p. 1-p. 21.

* cited by examiner

DUAL SENSOR IMAGING SYSTEM AND DEPTH MAP CALCULATION METHOD THEREOF

CROSS-REFERENCE TO RELATED APPLICATION

This application claims the priority benefit of U.S. Provisional Application No. 63/074,477, filed on Sep. 4, 2020 and Taiwan application serial no. 109146922, filed on Dec. 30, 2020. The entirety of each of the above-mentioned patent applications is hereby incorporated by reference herein and made a part of this specification.

BACKGROUND

Technical Field

The disclosure relates to an imaging system and a calculation method, and in particular to a dual sensor imaging system and a depth map calculation method thereof.

Description of Related Art

The exposure conditions of a camera (including aperture, shutter, and photosensitivity) may affect the quality of a captured image. Therefore, many cameras automatically adjust the exposure conditions during the image capturing process to obtain clear and bright images. However, in high-contrast scenes such as low light sources or backlights, the result of adjusting the exposure conditions of the camera may result in excessive noise or overexposure in some areas, such that the image quality of all areas cannot be taken care of.

In this regard, the current technology adopts a new image sensor architecture, which utilizes the characteristic of high light sensitivity of the infrared ray (IR) sensor, and interleaves IR pixels among the color pixels of the image sensor to assist in brightness detection. For example, FIG. 1 is a schematic diagram of conventional image capture using an image sensor. Please refer to FIG. 1, in addition to red (R), green (G), blue (B) and other color pixels, a conventional image sensor 10 is also interleaved with infrared (I) pixels. In this way, the image sensor 10 can combine color information 12 captured by the R, G, and B color pixels with brightness information 14 captured by the I pixels to obtain an image 16 with moderate color and brightness.

However, under the architecture of the single image sensor, the exposure conditions of each pixel in the image sensor are the same. Therefore, only the exposure conditions more suitable for color pixels or I pixels can be selected to capture images. It is still impossible to effectively use the characteristics of the two types of pixels to improve the image quality of the captured image.

SUMMARY

The disclosure provides a dual sensor imaging system and a depth map calculation method thereof, which can accurately calculate a depth map of an imaging scene.

The dual sensor imaging system of the disclosure includes at least one color sensor, at least one infrared ray (IR) sensor, a storage device, and a processor coupled to the color sensor, the IR sensor, and the storage device. The processor is configured to load and execute a computer program stored in the storage device to: control the color sensor and the IR sensor to respectively capture multiple color images and multiple IR images by adopting multiple exposure conditions suitable for an imaging scene; adaptively select a combination of the color image and the IR image that are comparable to each other from the color images and the IR images; and calculate a depth map of the imaging scene by using the selected color image and IR image.

The depth map calculation method of the dual sensor imaging system of the disclosure is suitable for the dual sensor imaging system including at least one color sensor, at least one infrared ray (IR) sensor, and a processor. The method includes the following steps. The color sensor and the IR sensor are controlled to respectively capture multiple color images and multiple IR images by adopting multiple exposure conditions suitable for an imaging scene. A combination of the color image and the IR image that are comparable to each other is adaptively selected from the color images and the IR images. A depth map of the imaging scene is calculated by using the selected color image and IR image.

Based on the above, the dual sensor imaging system and the depth map calculation method thereof of the disclosure use independently configured color sensor and IR sensor to respectively capture multiple images by adopting different exposure conditions suitable for the current imaging scene, and select the colors image and the IR image that are comparable to each other to calculate the depth map of the imaging scene, so as to accurately calculate the depth map of the imaging scene.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The embodiment of the disclosure is suitable for a dual sensor imaging system independently configured with a color sensor and an infrared ray (IR) sensor. Due to the parallax between the color sensor and the IR sensor, the captured color image and IR image may be used to calculate a depth map of an imaging scene. For the case where the color image captured by the color sensor may be overexposed or underexposed due to the influence of light reflection, shadow, high contrast, and other factors in the imaging scene, the embodiment of the disclosure takes advantages of the IR image having a better signal to noise ratio (SNR) and containing more texture details of the imaging scene, and uses texture information provided by the IR image to assist the calculation of a depth value of a defect area, so as to obtain an accurate depth map of the imaging scene.

Figure 1:
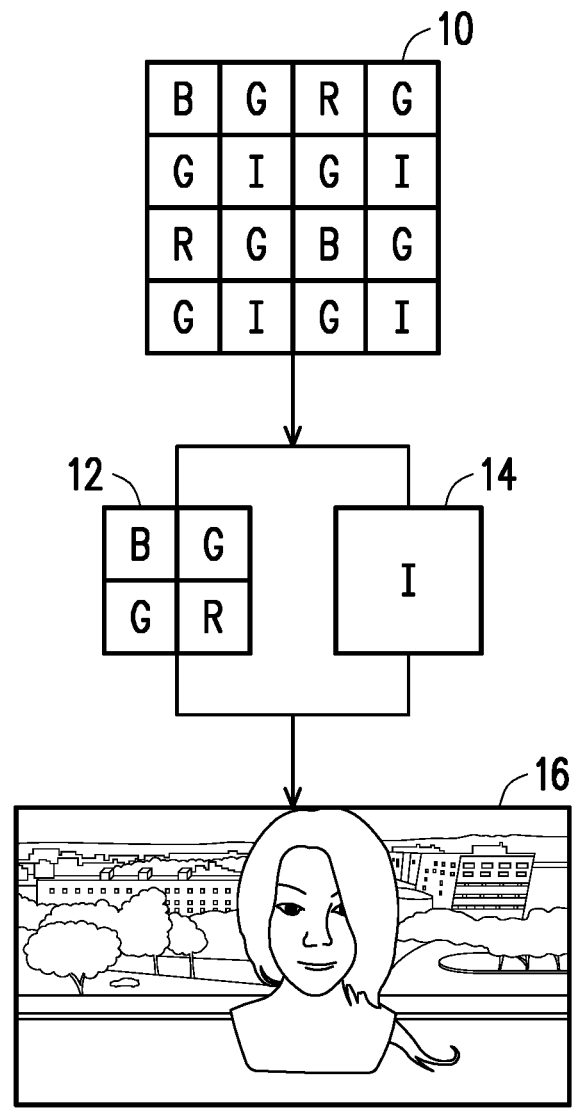
FIG. 1 is a schematic diagram of conventional image capture by using an image sensor.
Figure 2:
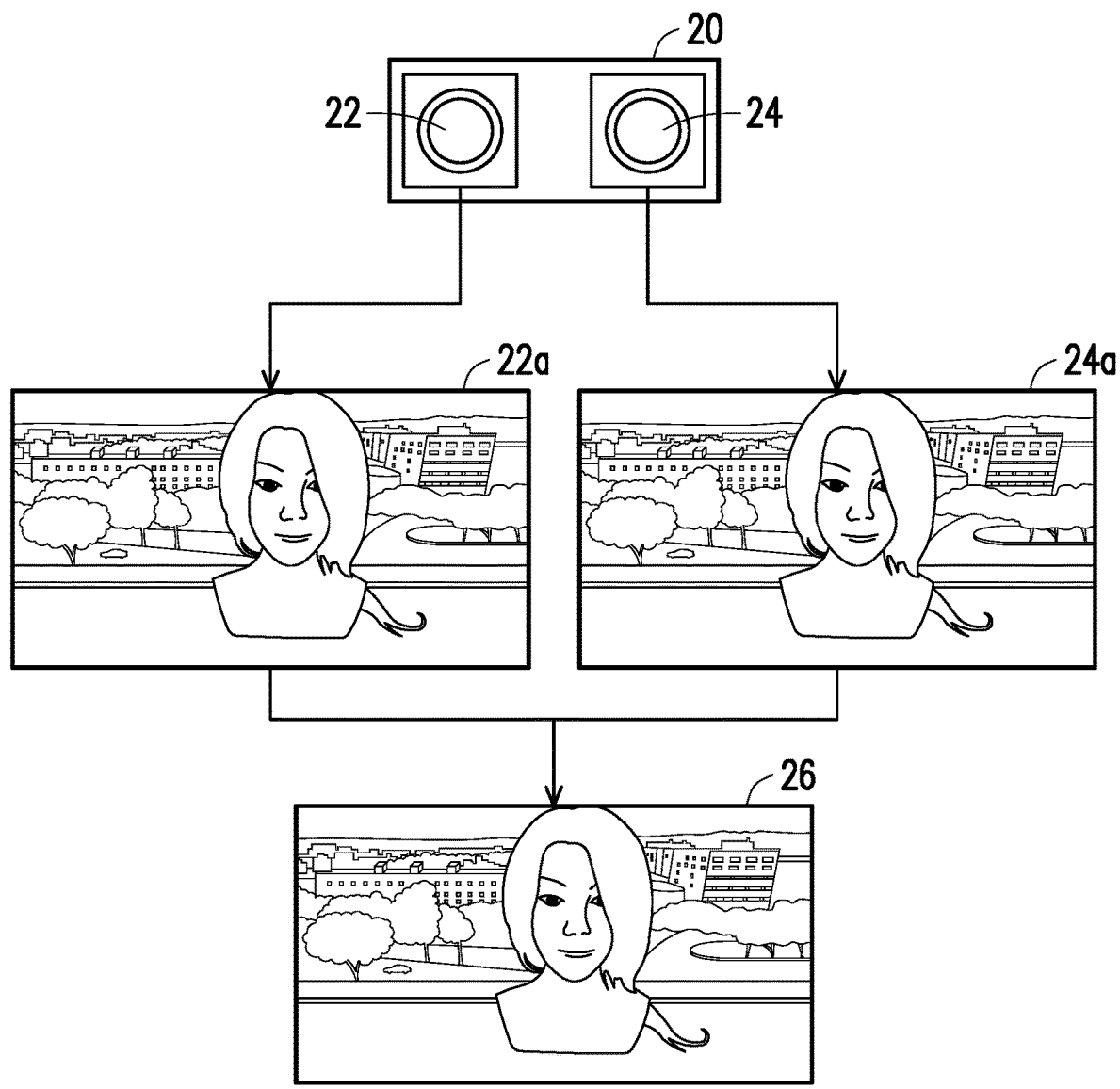
FIG. 2 is a schematic diagram of image capture by using an image sensor according to an embodiment of the disclosure.

FIG. 2 is a schematic diagram of image capture by using an image sensor according to an embodiment of the disclosure. Please refer to FIG. 2, an image sensor 20 of an embodiment of the disclosure adopts a dual sensor architecture of independently configured color sensor 22 and infrared ray (IR) sensor 24. Using the characteristics of each of the color sensor 22 and the IR sensor 24, multiple images are respectively captured by adopting multiple exposure conditions suitable for the current imaging scene, and a color image 22a and an IR image 24a with appropriate exposure conditions are selected. Through image fusion, the IR image 24a is used to complement the texture details lacking in the color image 22a, so as to obtain a scene image 26 with good color and texture details. In some embodiments, the color image 22a and the IR image 24a are used to calculate the depth map of the imaging scene. Then, the texture details provided by the IR image 24a is used to compensate for the texture details lacking in the color image, and to assist the calculation of a depth value of a defect area.

Figure 3:
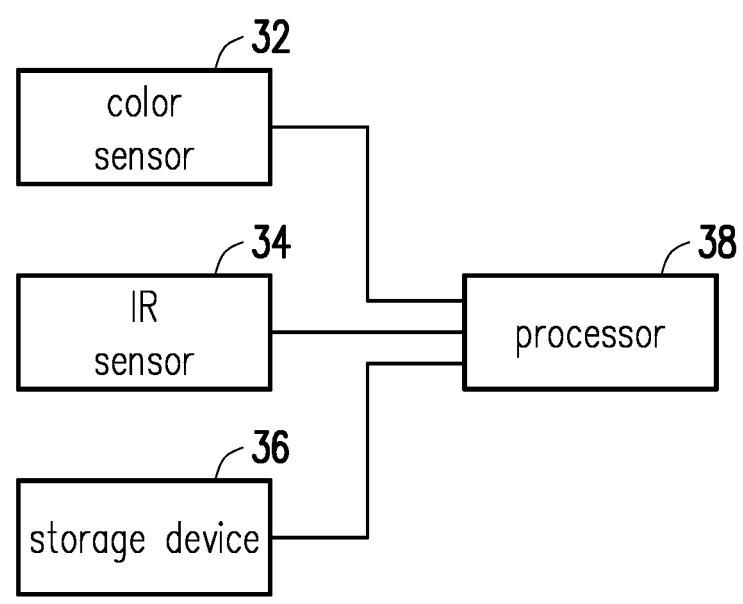
FIG. 3 is a block diagram of a dual sensor imaging system according to an embodiment of the disclosure.

FIG. 3 is a block diagram of a dual sensor imaging system according to an embodiment of the disclosure. Please refer to FIG. 3, a dual sensor imaging system 30 of the embodiment is configured in electronic devices such as mobile phones, tablets, laptops, navigation devices, dashcams, digital cameras, digital video cameras, etc., and is used to provide an imaging function. The dual sensor imaging system 30 includes at least one color sensor 32, at least one IR sensor 34, a storage device 36, and a processor 38, and the functions thereof are as follows.

The color sensor 32, for example, includes a charge coupled device (CCD), a complementary metal-oxide semiconductor (CMOS) element, or other types of photosensitive elements, and may sense light intensity to generate images of the imaging scene. The color sensor 32 is, for example, an RGB image sensor, which includes red (R), green (G), and blue (B) color pixels, and is used to capture color information of red light, green light, blue light, etc. in the imaging scene, and fuse the color information to generate a color image of the imaging scene.

The IR sensor 34, for example, includes a CCD, a CMOS element, or other types of photosensitive elements, and can sense infrared ray by adjusting the wavelength sensing range of the photosensitive element. The IR sensor 34, for example, uses the above photosensitive elements as pixels to capture infrared information in the imaging scene, and fuse the infrared information to generate an IR image of the imaging scene.

The storage device 36 is, for example, any type of fixed or removable random access memory (RAM), read-only memory (ROM), flash memory, hard disk, similar elements, or a combination of the above elements, and is used to store a computer program executed by the processor 38. In some embodiments, the storage device 36 may, for example, also store the color image captured by the color sensor 32 and the IR image captured by the IR sensor 34.

The processor 38 is, for example, a central processing unit (CPU), other programmable general-purpose or specific-purpose microprocessors, microcontrollers, digital signal processors (DSPs), programmable controllers, application specific integrated circuits (ASICs), programmable logic devices (PLDs), other similar devices, or a combination of these devices, and the disclosure is not limited thereto. In the present embodiment, the processor 38 may load a computer program from the storage device 36 to execute the depth map calculation method of the dual sensor imaging system of the embodiment of the disclosure.

Figure 4:
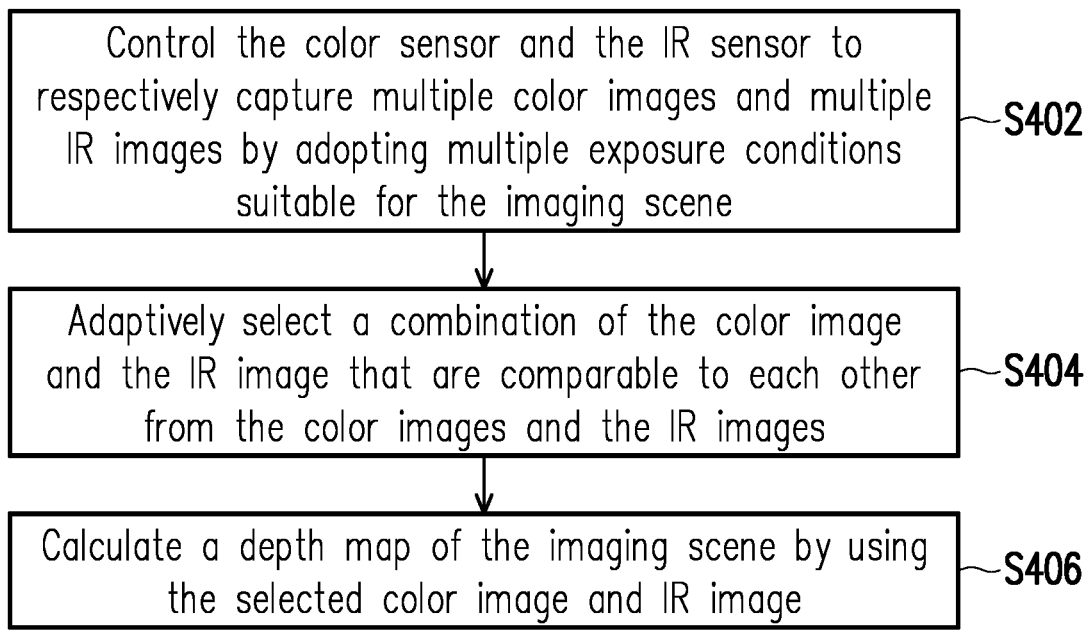
FIG. 4 is a flow chart of a depth map calculation method of the dual sensor imaging system according to an embodiment of the disclosure.

FIG. 4 is a flow chart of a depth map calculation method of the dual sensor imaging system according to an embodiment of the disclosure. Referring to FIG. 3 and FIG. 4 at the same time, the method of this embodiment is suitable for the dual sensor imaging system 30, and the detailed steps of the depth map calculation method of this embodiment are described below in conjunction with the elements of the dual sensor imaging system 30.

In Step S402, the processor 38 controls the color sensor 32 and the IR sensor 34 to respectively capture multiple color images and multiple IR images by adopting multiple exposure conditions suitable for the identified imaging scene.

In some embodiments, the processor 38, for example, controls the color sensor 32 and the IR sensor 34 to capture color images with shorter or longer exposure time based on the exposure time in the standard exposure condition. The difference between the exposure times of these color images is, for example, any value between −3 and 3 exposure values (EV), which is not limited thereto. For example, if an A image is twice as bright as a B image, the EV of the B image may be increased by 1, and so on. The exposure value may have decimals (for example, +0.3 EV), and there is no limitation here.

In some embodiments, the processor 38, for example, controls at least one of the color sensor 32 and the IR sensor 34 to capture at least one standard image of the imaging scene by adopting a standard exposure condition, and use these standard images to identify the imaging scene. The standard exposure condition, for example, includes aperture, shutter, photosensitivity, and other parameters determined by adopting existing metering technology. The processor 38 identifies the imaging scene, including the position (indoor or outdoor) of the imaging scene, the light source (high light source or low light source), contrast (high contrast or low contrast), type of target (object or portrait), state (dynamic or static), etc., according to strength or distribution of image parameters such as hue, value, chroma, and white balance of an image captured under the exposure condition. In other embodiments, the processor 38 may also identify the imaging scene by adopting the positioning manner or directly receiving the user operation to set the imaging scene, and there is no limitation here.

In Step S404, the processor 38 adaptively selects a combination of the color image and the IR image that are comparable to each other from the color images and the IR images. In some embodiments, the processor 38, for example, selects the combination of the color image and the IR image that are comparable to each other according to the color details of each color image and the texture details of each IR image. In some embodiments, the processor 38, for example, compares the image histograms of each color image and IR image based on the color image or the IR image, so as to confirm the combination of the color image and the IR image that are comparable to each other.

In Step S406, the processor 38 calculates a depth map of the imaging scene by using the selected color image and IR image. In some embodiments, the processor 38 may, for example, capture multiple feature points with strong features in the selected color image and IR image, and calculate the depth map of the imaging scene according to the positions of the corresponding feature points in the color image and the IR image.

By the above method, the dual sensor imaging system 30 may select the color image with better color details and the IR image with better texture details to calculate the depth map of the imaging scene, and use the IR image to compensate or replace the texture details lacking in the color image to calculate the depth value, so as to accurately calculate the depth map of the imaging scene.

In some embodiments, the processor 38 may, for example, first select one of the color images as a reference image according to the color details of each color image, and then identify at least one defect area lacking texture details in the reference image. Then, according to the texture details of the images corresponding to these defect areas in each IR image, one of the IR images is selected as an image that may be comparable with the reference image to be used together for the calculation of the depth map.

In detail, since the color sensor 32 can only adopt a single exposure condition to capture the color image at a time, each color image may have areas with high noise, overexposure, or underexposure (that is, the defect areas) when the imaging scene has low light source or high contrast. At this time, the processor 38 may use the characteristic of high light sensitivity of the IR sensor 34 to select the IR image with the texture details of the defect area from the previously captured IR images for the defect area, so as to be used to complement the texture details of the defect area in the color image.

Figure 5:
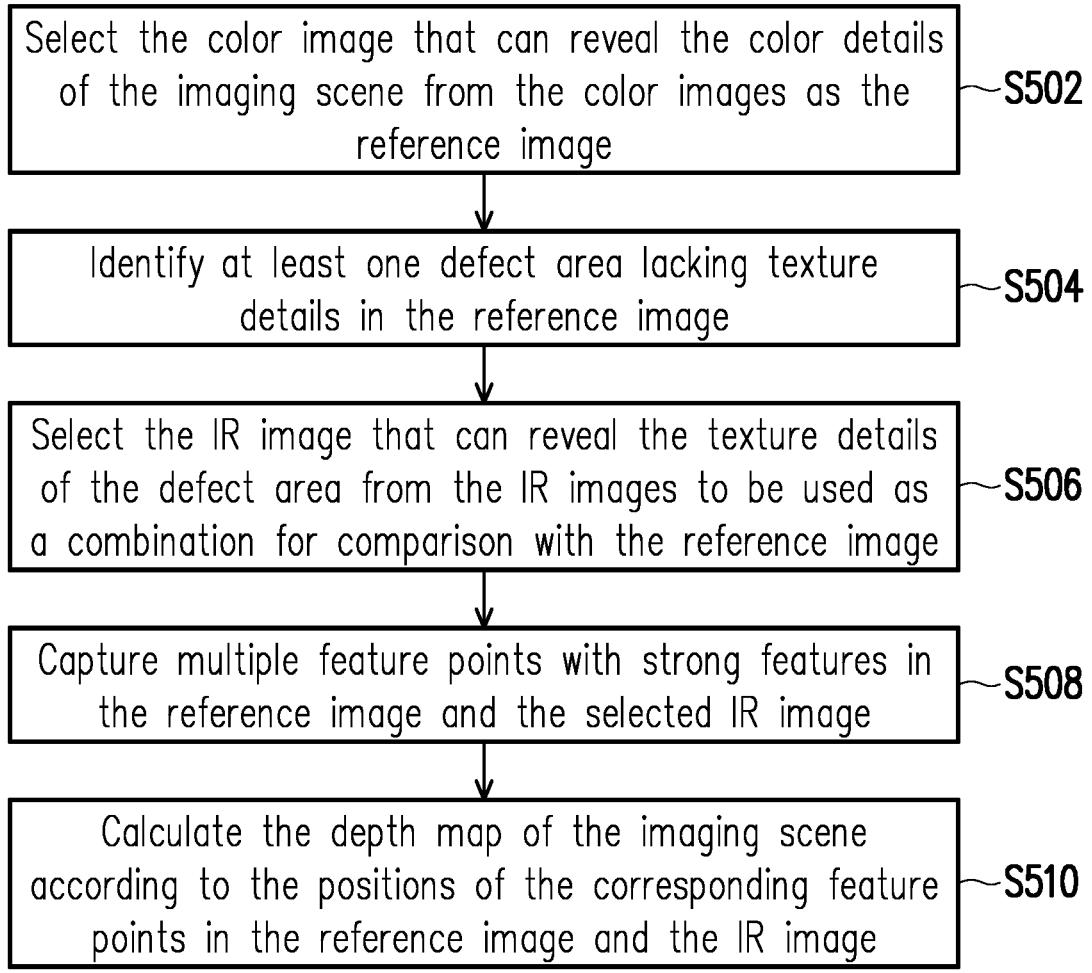
FIG. 5 is a flow chart of a depth map calculation method of the dual sensor imaging system according to an embodiment of the disclosure.

FIG. 5 is a flow chart of a depth map calculation method of the dual sensor imaging system according to an embodiment of the disclosure. Referring to FIG. 3 and FIG. 5 at the same time, the method of this embodiment is suitable for the dual sensor imaging system 30, and the detailed steps of the depth map calculation method of this embodiment are described below in conjunction with the elements of the dual sensor imaging system 30.

In Step S502, the processor 38 selects the color image that reveals the color details of the imaging scene from multiple color images as the reference image.

In some embodiments, the processor 38, for example, selects the color image with the most color details from the multiple color images as the reference image according to the color details of each color image. The amount of the color details may, for example, be determined by the size of the overexposed or underexposed area in the color image.

In detail, the color of pixels in the overexposed area approaches white, and the color of pixels in the underexposed area approaches black, so the color details in these areas will be less. Therefore, if the color image includes more such areas, it means that the color details thereof are less. Based on this, the processor 38 may determine which color image has the most color details to be used as the reference image. In other embodiment, the processor 38 may also distinguish the amount of color details of each color image according to the contrast, saturation, or other image parameters thereof, and there is no limitation here.

In Step S504, the processor 38 identifies at least one defect area lacking texture details in the reference image. The defect area is, for example, the overexposed area or underexposed area, or an area with higher noise captured under a low light source, and there is no limitation here.

In Step S506, the processor 38 selects one of the IR images according to the texture details of the image corresponding to the defect area in each IR image to be used as a combination for comparison with the reference image.

In some embodiments, the processor 38, for example, selects the IR image with the most texture details of the image corresponding to the defect area as the combination for comparison with the reference image. The processor 38, for example, distinguishes the amount of texture details of each IR image according to the contrast or other image parameters thereof, and there is no limitation here.

In Step S508, the processor 38 executes a feature capture algorithm to capture multiple feature points with strong features from the reference image and the selected IR image.

In some embodiments, the feature capture algorithm is, for example, Harris corner detector, Hessian-affine region detector, maximally stable extremal regions (MSER), scale invariant feature transform (SIFT), or speeded up robust features (SURF). The feature points are, for example, edge or corner pixels in the image, and there is no limitation here. In some embodiments, the processor 38 may also align the color image and the IR image according to the corresponding relationship between the captured features.

In Step 510, the processor 38 calculates the depth map of the imaging scene according to the positions of the corresponding feature points in the reference image and the IR image.

In some embodiments, the processor 38, for example, directly calculates the parallax of the corresponding pixels in the reference image and the IR image, and estimates the depth of each pixel according to the focal length of the color sensor 32 and the IR sensor 34 of the dual sensor imaging system 30 when capturing images, the spacing between the two sensors, and the parallax of each pixel. The processor 38, for example, calculates the displacement of each pixel between the reference image and the IR image according to the position of each pixel in the reference image and the IR image to be used as the parallax.

In detail, the parallax of the corresponding pixels in the reference image and the IR image captured by the dual sensor imaging system 30 is determined by the focal length (for determining the size of the image), the sensor spacing (for determining the image overlap range), and the distance between the object corresponding to the pixel and the sensor (that is, the depth value, for determining the size of the object in the image). There is a certain proportional relationship, and the relationship table recording this proportional relationship may be obtained by pre-testing the dual sensor imaging system 30 before leaving the factory. Therefore, when the user uses the dual sensor imaging system 30 to capture an image, and the processor 38 calculates the parallax of each pixel in the image, the pre-established relationship table may be used to obtain the depth value of each pixel.

By the above method, the dual sensor imaging system 30 may use the position relationship of the corresponding pixels in the color image and the IR image to calculate the depth value of each pixel, thereby obtaining an accurate depth map of the imaging scene.

Figure 6:
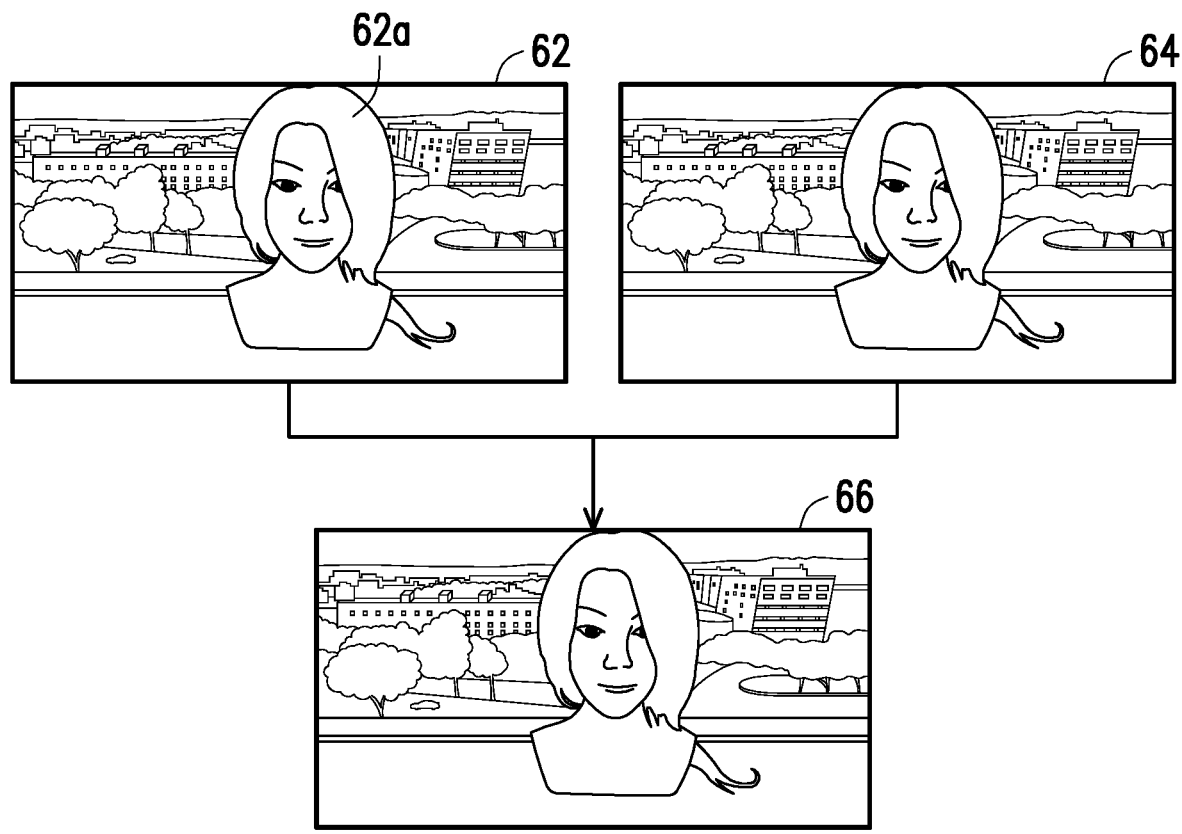
FIG. 6 is an example of a depth map calculation method of the dual sensor imaging system according to an embodiment of the disclosure.

For example, FIG. 6 is an example of a depth map calculation method of the dual sensor imaging system according to an embodiment of the disclosure. Referring to FIG. 6, in the embodiment, a color image 62 with the most color details is selected as the reference image through the depth map calculation method of FIG. 5. For the defect area lacking texture details (such as, a face area 62*a*) in the color image 62, an IR image 64 with the most texture details of the defect area is selected from multiple IR images captured by adopting different exposure conditions for comparison with the color image 62, so as to calculate an accurate depth map 66 of the imaging scene.

In some embodiments, when the user activates the live view mode, the processor 38, for example, controls the color sensor 32 to capture multiple color images, so as to execute auto focus. In this way, the focal length of the captured object is obtained, and the color image that can reveal the most color details of the object is determined according to the focal length.

In the live view mode, the processor 38, for example, controls the color sensor 32 to capture multiple color images with multiple exposure times longer or shorter than the exposure time based on the exposure time corresponding to the color image that can reveal the most color details of the object, so as to monitor environmental changes of the imaging scene. Similarly, the processor 38 may also control the IR sensor 34 to capture multiple IR images with multiple exposure times longer or shorter than the exposure time based on the exposure time corresponding to the IR image that can reveal the most texture details of the object. Finally, the processor 38 may select a combination of the color image and the IR image that are most comparable to each other from the images captured by the color sensor 32 and the IR sensor 34 to calculate the depth map of the imaging scene.

For example, in some embodiments, the processor 38 calculates the image histogram of each of these color images and IR images, and compares the image histograms of each color image and IR image based on the color image or the IR image, so as to confirm the combination of the color image and the IR image that are most comparable to each other to be used to calculate the depth map of the imaging scene.

In detail, in some embodiments, the processor 38, for example, selects one of the color images (such as selecting a color image that can reveal the most color details of the object) as the reference image, and selects one of the IR images (such as selecting an IR image that can reveal the most texture details of the object) to be compared with the reference image, so as to determine whether the brightness of the selected IR image is higher than the brightness of the reference image according to the image histograms of these images. If the determination result is yes, the processor 38 selects an IR image with an exposure time shorter than the exposure time of the selected IR image from the multiple IR images pre-captured by the IR sensor 34, or controls the IR sensor 34 to capture the IR image by adopting an exposure time shorter than the exposure time of the selected IR image to be used as a combination for comparison with the reference image. In contrast, if the determination result is no, the processor 38 selects an IR image with an exposure time longer than the exposure time of the selected IR image from the multiple IR images pre-captured by the IR sensor 34, or controls the IR sensor 34 to capture the IR image by adopting an exposure time longer than the exposure time of the selected IR image to be used as a combination for comparison with the reference image.

On the other hand, in some embodiments, the processor 38, for example, selects one of the IR images (such as selecting an IR image that can reveal the most texture details of the object) as the reference image, and selects one of the color images (such as selecting a color image that can reveal the most color details of the object) to be compared with the reference image, so as to determine whether the brightness of the selected color image is higher than the brightness of the reference image according to the image histograms of these images. If the determination result is yes, the processor 38 selects a color image with an exposure time shorter than the exposure time of the selected color image from the multiple color images pre-captured by the color sensor 32, or controls the color sensor 32 to capture the color image by adopting an exposure time shorter than the exposure time of the selected color image to be used as a combination for comparison with the reference image. In contrast, if the determination result is no, the processor 38 selects an color image with an exposure time longer than the exposure time of the selected color image from the multiple color images pre-captured by the color sensor 32, or controls the color sensor 32 to capture the color image by adopting an exposure time longer than the exposure time of the selected color image to be used as a combination for comparison with the reference image.

By the above method, the dual sensor imaging system 30 may adaptively select the combination of the color image and the IR images that are most comparable to each other from multiple color images and IR images to be used to calculate an accurate depth map of the imaging scene.

In some embodiments, even if the combination of the color image and the IR image that are most comparable to each other is selected to calculate the depth map of the imaging scene, the selected color image may still have many defect areas lacking color and/or texture details, which are known as occlusions, due to factors such as reflection or insufficient dynamic range of the color sensor 32. In this case, the texture details provided by the IR image may be used as a reference basis, and the depth value of the occlusion may be estimated from the depth value of the pixels around the occlusion.

Figure 7:
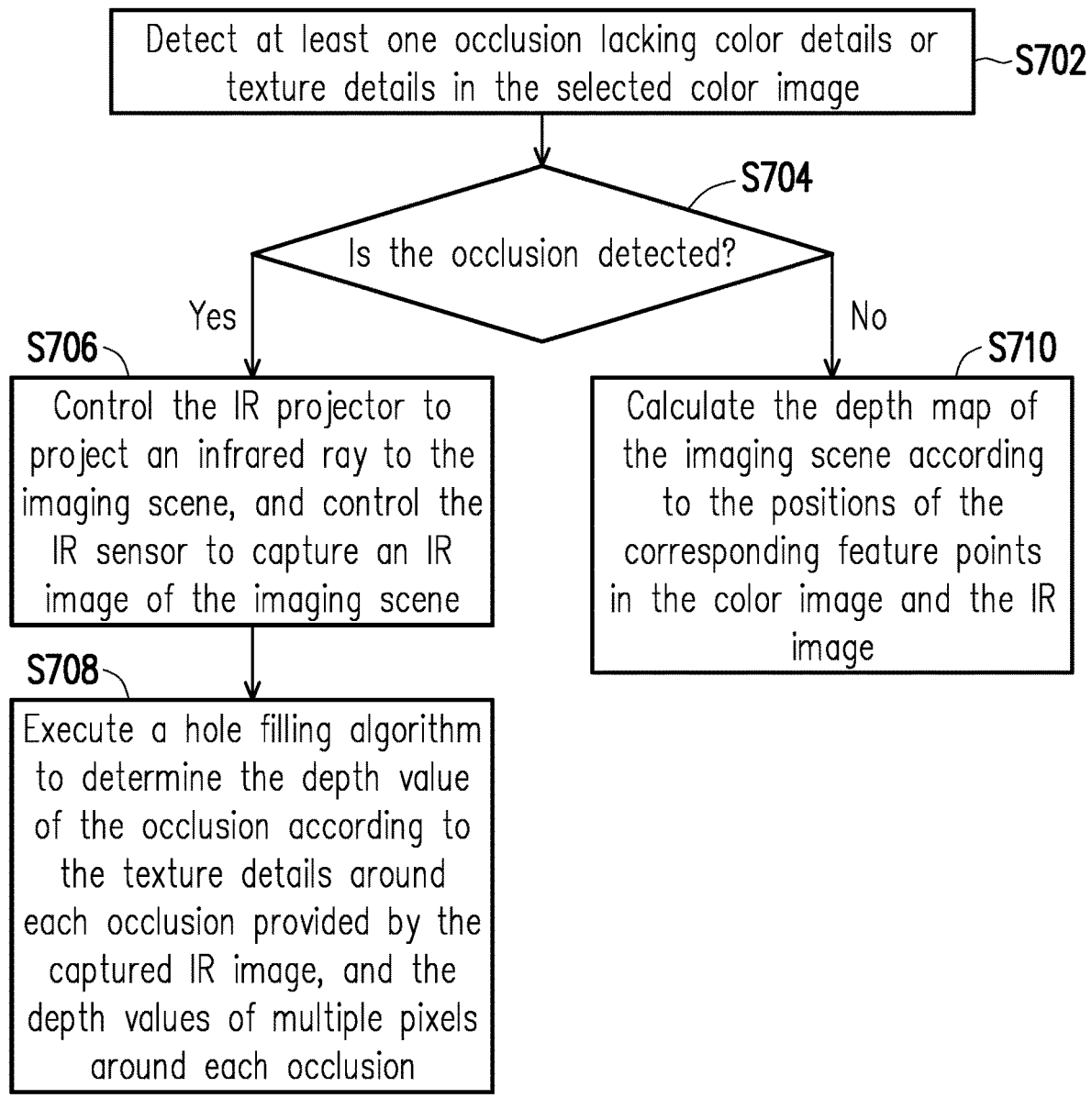
FIG. 7 is a flow chart of a depth map calculation method of the dual sensor imaging system according to an embodiment of the disclosure.

In detail, FIG. 7 is a flow chart of a depth map calculation method of the dual sensor imaging system according to an embodiment of the disclosure. Referring to FIG. 3 and FIG. 7 at the same time, the method of the embodiment is suitable for the dual sensor imaging system 30. An IR projector (not shown) such as an infrared ray light emitting diode (LED) is additionally configured in the dual sensor imaging system 30, and is used to enhance the texture details of the captured IR image. The detailed steps of the depth map calculation method of this embodiment are described below in conjunction with the elements of the dual sensor imaging system 30.

In Step S702, the processor 38 detects at least one occlusion lacking color details or texture details in the selected color image, and determines whether the occlusion is detected in Step S704.

If the occlusion is detected in Step S704, then in Step S706, the processor 38 controls the IR projector to project an infrared ray to the imaging scene, and controls the IR sensor 34 to capture the IR image of the imaging scene. By projecting the infrared ray to the imaging scene, the texture details of dark areas in the imaging scene captured by the IR sensor 34 may be enhanced to assist the subsequent calculation of the depth map.

In Step S708, the processor 38 determines the depth value of the occlusion according to the texture details around each occlusion provided by the IR image captured by the IR sensor 34, and the depth values of multiple pixels around each occlusion. In details, since the IR images may provide accurate texture details of the pixels around the occlusion, the depth values of surrounding pixels that have homogeneity with the occlusion may be used to fill in the depth values of holes in the depth map, so that the holes in the depth map may be filled with correct depth values with the assistance of the IR image.

On the other hand, if no occlusion is detected in Step S704, then in Step S710, the processor 38 calculates the depth map of the imaging scene according to the positions of the corresponding feature points in the reference image and the IR image. The step is the same as or similar to Step S510 of the previous embodiment, so the details will not be repeated here.

By the above method, the dual sensor imaging system 30 may effectively fill in the holes in the calculated depth map, thereby obtaining a complete and accurate depth map of the imaging scene.

In summary, the dual sensor imaging system and the depth map calculation method thereof of the disclosure use independently configured color sensor and IR sensor to respectively capture multiple images by adopting multiple exposure conditions suitable for the current imaging scene, and selects the colors image and the IR image that are comparable to each other to calculate the depth map, so as to accurately calculate the depth map of various imaging scenes. By using the texture details provided by the IR image to assist the calculation of the depth values of the holes in the depth map, a complete depth map of the imaging scene may be generated.

What is claimed is:

1. A dual sensor imaging system, comprising:
   at least one color sensor;
   at least one infrared ray (IR) sensor;
   a storage device, storing a computer program; and
   a processer, coupled to the at least one color sensor, the at least one IR sensor, and the storage device, and configured to load and execute the computer program to:
      control the at least one color sensor and the at least one IR sensor to respectively capture a plurality of color images and a plurality of IR images by adopting a plurality of exposure conditions suitable for an imaging scene, wherein the plurality of exposure conditions comprising aperture, shutter, and photosensitivity are determined by light metering technology;
      adaptively select a combination of the color image and the IR image that are comparable to each other from the color images and the IR images; and
      calculate a depth map of the imaging scene by using the selected color image and IR image,
   wherein the processor is configured to load and execute the computer program to:
      select a color image that can reveal color details of the imaging scene from the color images as a reference color image;
      identify at least one defect area lacking texture details in the reference color image; and
      select an IR image that can reveal the texture details of the defect area from the IR images to be used as a combination for comparison with the reference color image.

2. The dual sensor imaging system according to claim 1, wherein the processor:
   uses the color image to execute auto focus, so as to obtain a focal length of an object captured in the imaging scene, and determine a color image that can reveal the most color details of the object as the reference color image according to the focal length.

3. The dual sensor imaging system according to claim 1, wherein the processor:
   calculates image histograms of each of the color images and each of the IR images; and
   selects one of the color images or one of the IR images as a reference, and compares the image histograms of each of the color images and each of the IR images to determine the combination of the color image and the IR image that are comparable to each other.

4. The dual sensor imaging system according to claim 3, wherein the processor:
   selects one of the color images as a reference image, selects one of the IR images to be compared with the reference image, and determines whether brightness of the selected IR image is higher than brightness of the reference image according to the image histograms, wherein
   when yes, an IR image with an exposure time shorter than an exposure time of the selected IR image is selected from the captured IR images, or the at least one IR sensor is controlled to capture an IR image by adopting an exposure time shorter than the exposure time of the selected IR image to be used as a combination for comparison with the reference image; and
   when no, an IR image with an exposure time longer than the exposure time of the selected IR image is selected from the captured IR images, or the at least one IR sensor is controlled to capture an IR image by adopting an exposure time longer than the exposure time of the selected IR image to be used as the combination for comparison with the reference image.

5. The dual sensor imaging system according to claim 3, wherein the processor:
   selects one of the IR images as a reference image, selects one of the color images to be compared with the reference image, and determines whether brightness of the selected color image is higher than brightness of the reference image according to the image histograms, wherein
   when yes, a color image with an exposure time shorter than an exposure time of the selected color image is selected from the captured color images, or the at least one color sensor is controlled to capture a color image by adopting an exposure time shorter than the exposure time of the selected color image to be used as a combination for comparison with the reference image; and
   when no, a color image with an exposure time longer than the exposure time of the selected color image is selected from the captured color images, or the at least one color sensor is controlled to capture a color image by adopting an exposure time longer than the exposure time of the selected color image to be used as the combination for comparison with the reference image.

6. The dual sensor imaging system according to claim 1, wherein the processor:
   detects at least one occlusion lacking color details or texture details in the selected color image; and
   executes a hole filling algorithm to determine a depth value of the at least one occlusion according to texture details around each of the at least one occlusion provided by the selected IR image and depth values of a plurality of pixels around each of the at least one occlusion.

7. The dual sensor imaging system according to claim 6, wherein the dual sensor imaging system further comprises an IR projector, and the processor further:
   controls the IR projector to project an infrared ray to the imaging scene, and controls the at least one IR sensor to capture an IR image of the imaging scene when the at least one occlusion is detected; and
   determines the depth value of the at least one occlusion according to the texture details around each of the at least one occlusion provided by the captured IR image and the depth values of the pixels around each of the at least one occlusion.

8. The dual sensor imaging system according to claim 1, wherein the processor:
  captures a plurality of feature points with strong features in the selected color image and IR image; and
  calculates the depth map of the imaging scene according to positions of the corresponding feature points in the color image and the IR image.

9. The dual sensor imaging system according to claim 1, wherein the processor:
  controls at least one of the least one color sensor and the at least one IR sensor to capture at least one standard image of the imaging scene by adopting a standard exposure condition, and uses the at least one standard image to identify the imaging scene.

10. A depth map calculation method of a dual sensor imaging system, wherein the dual sensor imaging system comprises at least one color sensor, at least one IR sensor, and a processor, the depth map calculation method comprising:
  controlling the at least one color sensor and the at least one IR sensor to respectively capture a plurality of color images and a plurality of IR images by adopting a plurality of exposure conditions suitable for an imaging scene by the processor, wherein the plurality of exposure conditions comprising aperture, shutter and photosensitivity are determined by light metering technology;
  adaptively selecting a combination of the color image and the IR image that are comparable to each other from the color images and the IR images by the processor; and
  calculating a depth map of the imaging scene by using the selected color image and IR image by the processor,
  wherein the step of adaptively selecting the combination of the color image and the IR image that are comparable to each other from the color images and the IR images comprises:
    selecting a color image that can reveal color details of the imaging scene from the color images as a reference color image;
    identifying at least one defect area lacking texture details in the reference color image; and
    selecting an IR image that can reveal the texture details of the defect area from the IR images.

11. The depth map calculation method according to claim 10, wherein the step of selecting the color image that can reveal the color details of the imaging scene from the color images as the reference color image comprises:
  using the color image to execute auto focus, so as to obtain a focal length of an object captured in the imaging scene, and determine a color image that can reveal the most color details of the object as the reference color image according to the focal length.

12. The depth map calculation method according to claim 10, wherein the step of adaptively selecting the combination of the color image and the IR image that are comparable to each other from the color images and the IR images comprises
  calculating image histograms of each of the color images and each of the IR images; and
  selecting one of the color images or one of the IR images as a reference, and comparing the image histograms of each of the color images and each of the IR images to determine the combination of the color image and the IR image that are comparable to each other.

13. The depth map calculation method according to claim 12, wherein the step of comparing the image histograms of each of the color images and each of the IR images to determine the combination of the color image and the IR image that are comparable to each other comprises:
  selecting one of the color images as a reference image, selecting one of the IR images to be compared with the reference image, and determining whether brightness of the selected IR image is higher than brightness of the reference image according to the image histograms, wherein
  when yes, an IR image with an exposure time shorter than an exposure time of the selected IR image is selected from the captured IR images, or the at least one IR sensor is controlled to capture an IR image by adopting an exposure time shorter than the exposure time of the selected IR image to be used as a combination for comparison with the reference image; and
  when no, an IR image with an exposure time longer than an exposure time of the selected IR image is selected from the captured IR images, or the at least one IR sensor is controlled to capture an IR image by adopting an exposure time longer than the exposure time of the selected IR image to be used as the combination for comparison with the reference image.

14. The depth map calculation method according to claim 12, wherein the step of comparing the image histograms of each of the color images and each of the IR images to determine the combination of the color image and the IR image that are comparable to each other comprises:
  selecting one of the IR images as a reference image, selecting one of the color images to be compared with the reference image, and determining whether brightness of the selected color image is higher than brightness of the reference image according to the image histograms, wherein
  when yes, a color image with an exposure time shorter than an exposure time of the selected color image is selected from the captured color images, or the at least one color sensor is controlled to capture a color image by adopting an exposure time shorter than the exposure time of the selected color image to be used as a combination for comparison with the reference image; and
  when no, a color image with an exposure time longer than the exposure time of the selected color image is selected from the captured color images, or the at least one color sensor is controlled to capture a color image by adopting an exposure time longer than the exposure time of the selected color image to be used as the combination for comparison with the reference image.

15. The depth map calculation method according to claim 10, further comprising:
  detecting at least one occlusion lacking color details or texture details in the selected color image; and
  executing a hole filling algorithm to determine a depth value of the at least one occlusion according to texture details around each of the at least one occlusion provided by the selected IR image and depth values of a plurality of pixels around each of the at least one occlusion.

16. The depth map calculation method according to claim 15, wherein the dual sensor imaging system further comprises an IR projector, and after the step of detecting the at least one occlusion lacking the color details or the texture details in the selected color image, the depth map calculation method further comprises:
  controlling the IR projector to project an infrared ray to the imaging scene, and controlling the at least one IR sensor to capture an IR image of the imaging scene when the at least one occlusion is detected; and determining the depth value of the at least one occlusion according to the texture details around each of the at least one occlusion provided by the captured IR image and the depth values of the pixels around each of the at least one occlusion.

17. The depth map calculation method according to claim 10, wherein the step of calculating the depth map of the imaging scene by using the selected color image and IR image comprises:

capturing a plurality of feature points with strong features in the selected color image and IR image; and calculating the depth map of the imaging scene according to positions of the corresponding feature points in the color image and the IR image.

18. The depth map calculation method according to claim 10, wherein before the step of controlling the at least one color sensor and the at least one IR sensor to respectively capture the color images and the IR images by adopting the exposure conditions suitable for the imaging scene, the depth map calculation method further comprises:

controlling at least one of the least one color sensor and the at least one IR sensor to capture at least one standard image of the imaging scene by adopting a standard exposure condition, and using the at least one standard image to identify the imaging scene.

\* \* \* \* \*